United States Patent Office 3,393,193
Patented July 16, 1968

3,393,193
C-DIALKYLATION OF PHENOTHIAZINE
John Scotchford Elliott, Eric Descamp Edwards, and Anthony David Brazier, London, England, assignors to Castrol Limited (formerly C. C. Wakefield & Company Limited), London, England
No Drawing. Continuation-in-part of application Ser. No. 51,771, Aug. 25, 1960. This application May 1, 1964, Ser. No. 364,300
Claims priority, application Great Britain, Aug. 26, 1959, 29,236/59
2 Claims. (Cl. 260—243)

This application is a continuation-in-part of our application No. 51,771 filed on Aug. 25, 1960, now abandoned.

This invention relates to the C-dialkylation of phenothiazine. C-dialkylated phenothiazines, for example 3,7-dioctyl phenothiazine which is of commercial importance as a synthetic lubricant additive, have previously been made by the sulphurization of dialkylated diphenylamines.

The preparation of mono-ethyl phenothiazine is described in British patent specification No. 807,668. The process is carried out at an initial pressure of from 20 to 1000 atmospheres and a temperature of from 100° C. to 500° C. and there may be employed as a catalyst a mixture of aluminum (in metal form or in combination with an aromatic amine) with a Friedel-Crafts cataylst which may be boron fluoride. No simpler way of alkylating phenothiazine was previously known, and no way at all of di-alkylating phenothiazine.

Most Friedel-Crafts catalysts are quite ineffective for the alkylation of phenothiazine. Attempts to prepare di-octyl phenothiazine were entirely ineffective when the following conventional Friedel-Crafts catalysts were used, no product being recovered in any case; stannic chloride, phosphoric acid, tetraphosphoric acid, concentrated sulphuric acid, aluminum chloride, titanium tetrachloride, and bismuth trichloride. Similarly complexes of boron trifluoride with bases such as pyridine, ethylamine and diphenylamine will not catalyze the alkylation reaction, and anhydrous boron trifluoride or complexes thereof with acidic complexing agents such as phosphoric acid and acetic acid promote polymerization of the alkene rather than alkylation of the phenothiazine.

It is an object of this invention to effect a one-step di-alkylation of phenothiazine.

It is another object of this invention to provide a cheaper and easier route to alkylated phenothiazing than those hitherto known.

It is another object of this invention to provide a Friedel-Crafts-type catalyst for the di-alkylation of phenolthiazine which is novel for this purpose.

Other objects will appear from the specific examples of the invention given below.

The invention provides a process for the C-dialkylation of phenothiazine which process consists essentially in the steps of heating together, at a temperature of from 50° C. to 150° C. in a fluid reaction medium, phenothiazine and an alkene having the formula

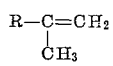

where R is a saturated monovalent alkyl radical having from 1 to 9 carbon atoms, effecting alkylation of the phenothiazine by the alkene by the use, as a catalyst, of a boron trifluoride complex selected from the group consisting of hydrates, alcoholates, etherates, complexes with carboxylic acid esters and complexes with nitriles, and recovering the dialkylated phenothiazine.

The catalysts are boron trifluoride complexes, preferably with water, examples of which are BF$_3$.H$_2$O and BF$_3$2H$_2$O. The complexes may also be with alcohols, ethers, carboxylic acid esters, and nitriles. Examples of catalysts for use in this invention are:

Boron fluoride ethyl acetate complex BF$_3$.CH$_3$COOC$_2$H$_5$
Boron fluoride methyl benzoate complex

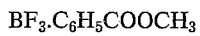

Boron fluoride methanol complexes BF$_3$.CH$_3$OH,

BF$_3$.2CH$_3$OH

Boron fluoride ethanol complex BF$_3$.C$_2$H$_5$OH
Boron fluoride glycol complex BF$_3$.(CH$_2$OH)$_2$
Boron fluoride etherate BF$_3$.(C$_2$H$_5$)$_2$O
Boron fluoride methyl amyl ether complex

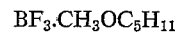

Boron fluoride anisole complex BF$_3$.C$_6$H$_5$OCH$_3$
Boron fluoride tetrahydrofuran complex BF$_3$.C$_4$H$_8$O
Boron fluoride dioxan complex BF$_3$.C$_4$H$_8$O$_2$
Boron fluoride acetonitrile complex BF$_3$.CH$_3$CN
Boron fluoride benzonitrile complex BF$_3$.C$_6$H$_5$CN
Boron fluoride complexes with o-m- and p-toluonitrile.

Another satisfactory catalyst is 40% aqueous fluoboric acid, which is believed to function in the same way as the boron fluoride hydrates.

The invention only covers complexes of boron trifluoride with known organic compounds in the classes given above. However, obviously other complexes can be used in place of those listed. Thus for instance a complex with any aliphatic alcohol having a saturated alkyl chain containing from 1 to 6 carbon atoms would clearly be equivalent for the purpose in question to the specific examples of alcohol complexes given above. Similarly complexes with ethers having two saturated alkyl chains each containing from 1 to 6 carbon atoms are clearly equivalents; also ethers where one group is phenyl or naphthyl. Similarly complexes with carboxylic acid esters having saturated alkyl radicals with from 1 to 6 carbon atoms in the acid and alcohol groups are clearly equivalent; also carboxylic acid esters where one group is phenyl or naphthyl. Similarly complexes with nitriles of naphthyl and saturated alkyl radicals having from 1 to 6 carbon atoms are clearly equivalent.

It was not foreseeable from the prior art that these particular catalysts would be effective. Bruner has taught in United States Patent 2,376,119 the use of boron trifluoride hydrates to alkylate aromatic compounds e.g. benzene, with normally gaseous olefins under pressure. Similarly Schultz et al. taught in United States Patent No. 2,425,839 the use of boron trifluoride alcoholates to alkylate aromatic compounds such as benzene. But it has never been suggested that heterocyclic compounds can necessarily be alkylated in the same way as aromatic compounds. In Chemical Reviews it was stated (1954, pages 813–814), well after the issue of patents to Bruner and Schultz, that no alkylation of phenothiazine by the Friedel-Crafts method had been reported, and the subsequent British specification No. 807,668 taught the use of a different and more complex catalyst.

The alkylation of thiophene with boron trifluoride complex catalysts has also been reported. But thiophene is well known to be more amenable to alkylation than benzene, whereas phenothiazine is not only much less reactive than benzene, but requires the use of complex catalysts for alkylation which do not de-activate the molecule by co-ordinating with the nitrogen atom.

It is also noteworthy that:

(a) Other boron trifluoride complexes as hereinbefore mentioned do not catalyze the reaction, (b) Such similar heterocyclic compounds as phenazine, pyridine, quinoline, benzimidazole and benzothiazole are not alkylated by the catalysts of the invention, (c) The presence in the alkylating agent of a methyl group adjacent the double bond is essential.

The choice of alkylating agent is therefore critical. Examples of suitable alkenes are:

Isobutylene
Di-isobutylene
Tri-isobutylene
2-methyl-but-1-ene
2-methyl-pent-1-ene
2-methyl-hept-1-ene
2-methyl-non-1-ene
2-methyl-undec-1-ene Di-isobutylene is preferred as better yields have been obtained with it than with other alkenes. In certain cases, it is possible to employ in the reaction mixture the corresponding tertiary alcohol and form the alkene in situ in the reaction mixture. The tertiary alcohol is thus first decomposed by the boron fluoride complex to provide the alkene which then reacts with the phenothiazine.

The presence of the methyl group adjacent to the double bond of the alkene has been found to be essential; atempts to alkylate phenothiazine with compounds such as decene-1, propylene tetramer and 2-ethyl hexene-1 have proved unsuccessful.

Although the reaction will proceed in the absence of a solvent, a non-polar hydrocarbon solvent is preferably employed, e.g., heptane, iso-octane, or petroleum ether (B.P. 80–100° C. or 100–120° C.). The presence of some aromatic hydrocarbons does not appear to be detrimental, although theoretically these might be alkylated too, and, if this occurred, it would reduce the yields.

The recation is preferably carried out at atmospheric pressure, although superatmospheric pressure may be used. A reaction temperature of between 80 and 120° C. has been found preferable in carrying out the invention. The reaction can be promoted and yields improved by the use of a catalyst promoter, e.g., an organic sulphonic acid, such as p-toluenesulphonic acid, used in amounts of 1 to 10%, preferably 5% by weight on the weight of phenothiazine present.

The products of the invention are invariably dialkylated, and it may therefore be convenient to use appropriate molar quantities of alkene and phenothiazine, or possibly a small excess of alkene. However, reaction proceeds with any proportions of reagents, and the invention is not limited to any particular proportions. Similarly, reaction proceeds when catalyst is present irrespective of the amount of catalyst, but it is preferred to use from 0.1 to 3 moles, e.g., 0.2 to 1.5 moles, of catalyst per mole of phenothiazine to obtain optimum yields.

The following specific examples illustrate the process.

EXAMPLE I

Preparation of 3,7 dioctyl phenothiazine

The apparatus consisted of a 3-necked 1 litre flask fitted with a thermometer pocket, mercury sealed stirrer, and a reflux condenser.

Into the flask were placed:

Phenothiazine (0.5 mol) _____gm__ 100
Diisobutylene (1.0 mol) _____gm__ 112
BF$_3$·2H$_2$O (0.1 mol) (catalyst) _____gm__ 10.4
p-Toluenesulphonic acid (catalyst
  promoter) _____gm__ 5
Heptane _____mls__ 200

This mixture was refluxed gently for 4 hours, during which time the solution turned deep purple. The bulk liquid temperature was not allowed to rise above 95° C., to obviate the formation of by-products.

At the end of the reaction period the solution was thrown into hot 10% aqueous caustic soda and shaken well. The purple colour disappeared and was replaced by a green coloration. More heptane was added to extract the product. This was repeated twice more, the solution being heated each time. The heptane layer was then separated and the solvent removed by distillation. The remaining solid was recrystallised from heptane.

By these means 126 grams of a pale green crystalline material melting at 163°–5° C. were obtained, this representing a 60% yield. After one further recrystallisation from heptane the M.P. was raised to 167° C.

EXAMPLE II

Preparation of 3,7 dioctyl phenothiazine

The process of Example I was repeated though with 200 mls. isooctane as solvent, but the catalyst promoter was omitted. 114 gm. product were isolated with difficulty. The yield in this case was 53%.

EXAMPLE III

Preparation of 3,7 dioctyl phenothiazine

The same amounts of reactants were used as in Example I (including catalyst promoter) but the reaction was performed in petroleum ether (B.P. 80–100° C. and containing about 11% aromatics).

The solution was refluxed gently for 4 hours. The bulk temperature remained at 91–93° C. throughout.

Finally 141 gms. of the product were isolated representing a yield of 67%, after one recrystallisation from heptane.

EXAMPLE IV

Preparation of 3,7-didodecyl phenothiazine

This substance was prepared by the procedure described in Example I from

Phenothiazine (0.1 mol) _____gm__ 19.9
Triisobutylene (0.2 mol) _____gm__ 33.6
BF$_3$2H$_2$O (0.15 mol) _____gm__ 15.6
p-Toluenesulphonic acid _____gm__ 0.5
Pet. ether (80–100° C. boiling range) _____ml__ 50

The reaction product was very resinous, but, after recrystallisation from heptane, there were obtained 7.5 gms. (14%) of didodecyl phenothiazine, melting at 141° C.

Analysis indicated the compound to contain 5.27% S, the theoretical figure for didodecyl phenothiazine being 5.98% S.

EXAMPLE V

Preparation of 3,7-di-t-butyl phenothiazine from t-butyl alcohol

Into a flask fitted as described in Example I were placed the following:

Phenothiazine (0.2 mol) _____gm__ 39.8
t-Butyl alcohol (0.4 mol) _____gm__ 29.6
BF$_3$2H$_2$O (0.4 mol) _____gm__ 41.6
p-Toluenesulponhic acid _____gm__ 2.0
Pet. ether (80–100° C. boiling range) _____ml__ 200

The mixture was refluxed for five hours with stirring, after which it was poured into hot 10% caustic soda solution and shaken. It was then extracted with petroleum ether, the organic layer being separated, washed with water, and the solvent removed by distillation.

The grey solid so obtained was recrystallised from heptane and then from alcohol, yielding 16 grams (23%) of a solid melting at 206° C.

This solid was further purified by dissolving in petroleum ether and shaking first with dilute aqueous hydrochloric acid, then with dilute aqueous caustic soda and finally with water. The solution was then dried over anhydrous magnesium sulphate and the solvent removed by distillation.

The di-t-butyl phenothiazine so obtained melted at 210° C. and contained 4.46% N and 9.77% S, the theoretical figures being 4.50% N and 10.29% S.

EXAMPLE VI

Preparation of 3,7 dioctyl phenothiazine; use of alternative catalysts

A series of preparations of 3,7 dioctyl phenothiazine were carried out by the general procedure set forth in Example I, but substituting various catalysts for boron fluoride dihydrate. The results of these experiments are summarised in Table I.

TABLE I

| Catalyst | Moles of Phenothiazine | Moles of Catalyst | Percentage yield of product | Melting point (° C.) |
|---|---|---|---|---|
| $BF_3 \cdot 2CH_3OH$ | 0.1 | 0.05 | 35 | 167.5 |
| $BF_3 \cdot (C_2H_5)_2O$ | 0.1 | 0.05 | 43 | 167–168 |
| $BF_3 \cdot HF(40\%$ w./w. in $H_2O)$ | 0.1 | 0.05 | 39 | 167 |
| $BF_3 \cdot C_6H_5CN$ | 0.1 | 0.05 | 38 | 163 |

What we claim is:

1. A process for the preparation of 3,7-dioctyl phenothiazine comprising the steps of refluxing phenothiazine and di-isobutylene in non-polar hydrocarbon solvent having a boiling point about 80–120° C. in the presence of 0.2 to 1.5 mols per mol of phenothiazine of a catalyst consisting essentially of boron-trifluoride-dihydrate.

2. A process according to claim 1 wherein the reaction is carried out in the presence of 1–10% by weight based on the weight of the phenothiazine of p-toluene sulfonic acid co-catalyst.

References Cited

UNITED STATES PATENTS

| | | | |
|---|---|---|---|
| 2,376,119 | 5/1945 | Bruner et al. | 260—671 |
| 2,425,839 | 7/1947 | Schulze et al. | 260—671 |
| 2,469,823 | 5/1949 | Hansford et al. | 260—329 |
| 2,721,886 | 10/1955 | Pines et al. | 260—315 |
| 2,859,251 | 11/1958 | Linn | 260—624 |

FOREIGN PATENTS 807,668  1/1959  Great Britain.

OTHER REFERENCES

Caesar, J. Am. Chem. Soc., vol. 70, p. 3623–3625 (1950).

Pines et al., J. Am. Chem. Soc., vol. 72, p. 1568–1571 (1950).

JOHN D. RANDOLPH, *Primary Examiner.*

WALTER A. MODANCE, N. S. MILESTONE, *Examiners.*

H. I. MOATZ, *Assistant Examiner.*